United States Patent [19]

DeFriese et al.

[11] Patent Number: 5,603,801
[45] Date of Patent: Feb. 18, 1997

[54] INFINITE UNIVERSAL SEALING ASSEMBLY

[76] Inventors: John M. DeFriese; David Gassel, both of 4523 Riverview Blvd., St. Louis, Mo. 63120

[21] Appl. No.: 349,742

[22] Filed: Dec. 5, 1994

Related U.S. Application Data

[62] Division of Ser. No. 56,060, Apr. 30, 1993.

[51] Int. Cl.⁶ .................................................. B32B 31/00
[52] U.S. Cl. ...................... 156/515; 156/251; 156/583.5; 53/373.5; 53/389.5; 493/194
[58] Field of Search .................................. 156/250, 251, 156/267, 269, 353, 355, 308.2, 510, 515, 518, 583.5; 53/373.5, 416, 450, 451, 477, 479, 389.3, 389.5, 550; 493/82, 189, 193, 194, 199, 203, 207, 224, 227

[56] References Cited

U.S. PATENT DOCUMENTS

| | | | |
|---|---|---|---|
| 2,117,452 | 5/1938 | Robinson et al. | 156/515 |
| 2,794,485 | 6/1957 | Ashton et al. | 154/42 |
| 2,990,875 | 7/1961 | Samuels | 154/42 |
| 3,007,835 | 11/1961 | Rosenberg et al. | 156/515 X |
| 3,067,553 | 12/1962 | Rivman et al. | 53/28 |
| 3,070,212 | 12/1962 | Shabram | 198/35 |
| 3,122,466 | 2/1964 | Shabram | 156/515 |
| 3,126,777 | 3/1964 | Shabram | 83/174 |
| 3,142,602 | 7/1964 | Shabram | 156/359 |
| 3,142,608 | 7/1964 | Techtmann et al. | 156/515 |
| 3,156,010 | 11/1964 | Osborn, Jr. | 156/515 |
| 3,195,289 | 7/1965 | Cochrane | 53/182 |
| 3,230,663 | 1/1966 | Shabram | 46/90 |
| 3,239,993 | 3/1966 | Cherrin | 53/182 |
| 3,262,833 | 1/1966 | Zelnick | 156/583 |
| 3,276,940 | 10/1966 | Shabram | 156/515 |
| 3,323,282 | 6/1967 | Duns | 53/182 |
| 3,340,776 | 9/1967 | Shabram | 93/8 |
| 3,448,555 | 6/1969 | Shabram | 53/29 |
| 3,490,981 | 1/1970 | Shanklin | 156/583 |
| 3,496,700 | 2/1970 | McCabe et al. | 53/167 |
| 3,749,635 | 7/1973 | Logain | 156/515 |
| 3,805,485 | 4/1974 | Swope | 53/182 |
| 4,211,599 | 7/1980 | Bolter et al. | 156/494 |
| 4,444,613 | 4/1984 | Burmeister | 156/446 |
| 4,534,819 | 8/1985 | Payet et al. | 156/515 |
| 4,608,797 | 9/1986 | Shabram, Jr. et al. | 53/504 |
| 4,650,535 | 3/1987 | Bennett et al. | 156/352 |
| 4,680,073 | 7/1987 | Brunner et al. | 156/267 X |
| 4,697,401 | 10/1987 | Kessler et al. | 53/459 |
| 4,757,893 | 7/1988 | Shabram, Jr. et al. | 198/474.1 |

OTHER PUBLICATIONS

Conflex A–2800 In–Line Sealer.
Conflex E–250 In–Line Sealer.
Alloy Packaging Systems 10I–12–C.
Great Lakes TS37 SideSeal Horiz Wrapper.

*Primary Examiner*—James Engel
*Attorney, Agent, or Firm*—Heller & Kepler

[57] ABSTRACT

An infinite heat sealing assembly preferably for heat sealing a thermoplastic heat-shrinkable plastic film, has a heat sealing assembly for cutting and sealing a seam in a film or layers of film without regard to the length of the seam. The heat sealing assembly includes a heated blade and a plurality of belt conveyors for conveying the film with a desired tracking through the assembly. An adjustable angle blade and slotted film support ramp result in improved sealing of heavier gauge films by increasing the dwell time of the film on the heated blade.

17 Claims, 13 Drawing Sheets

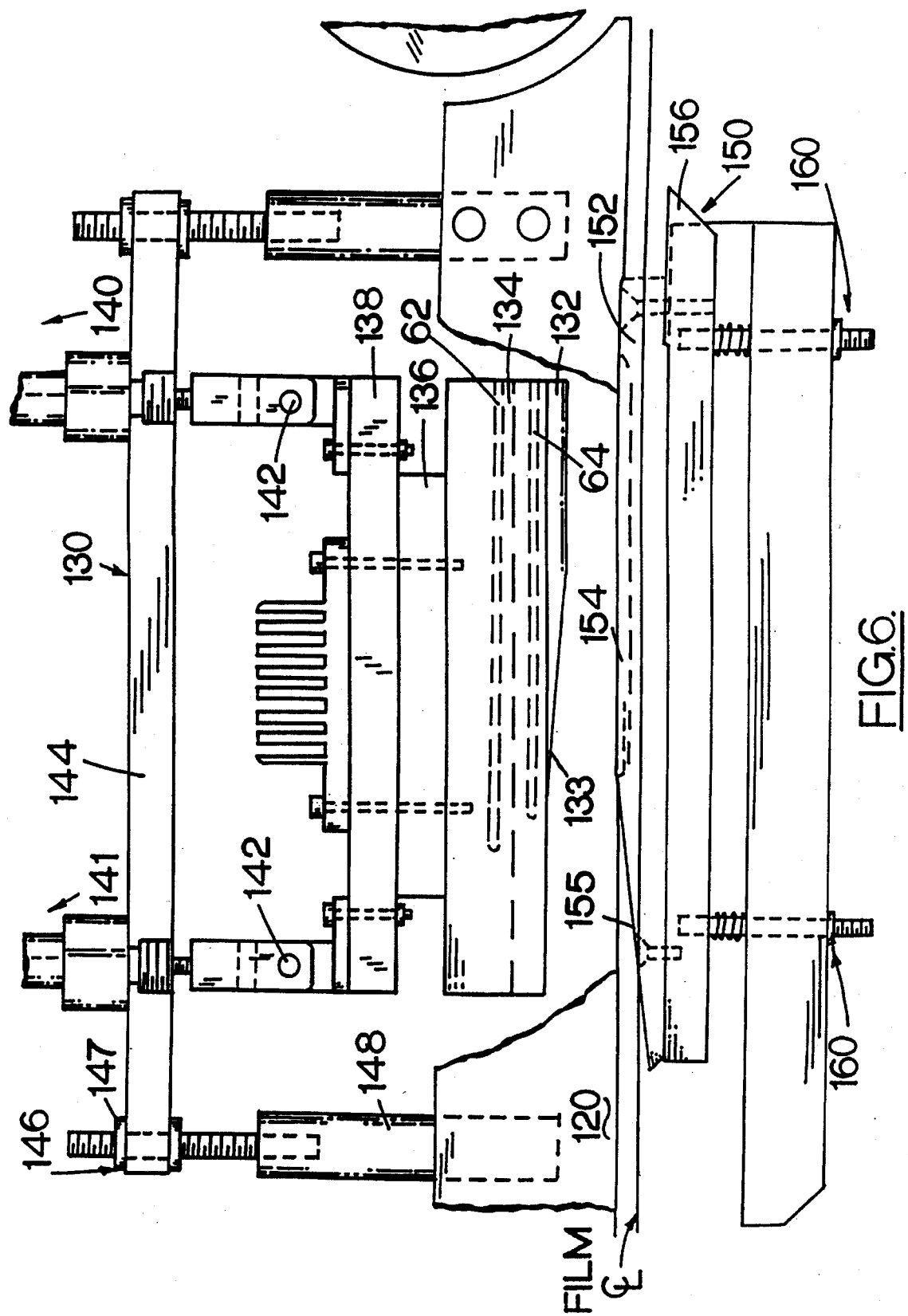

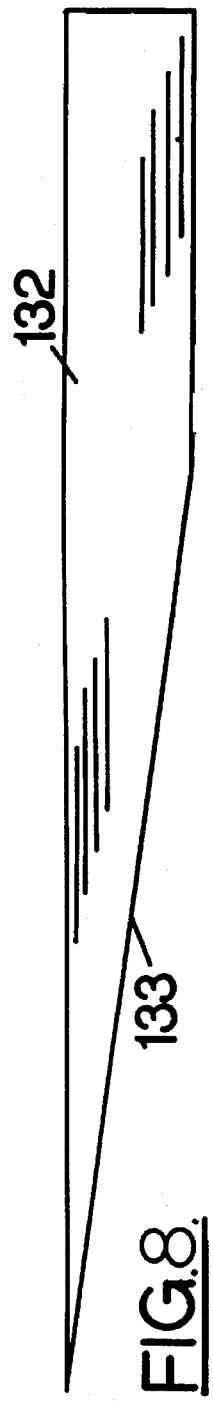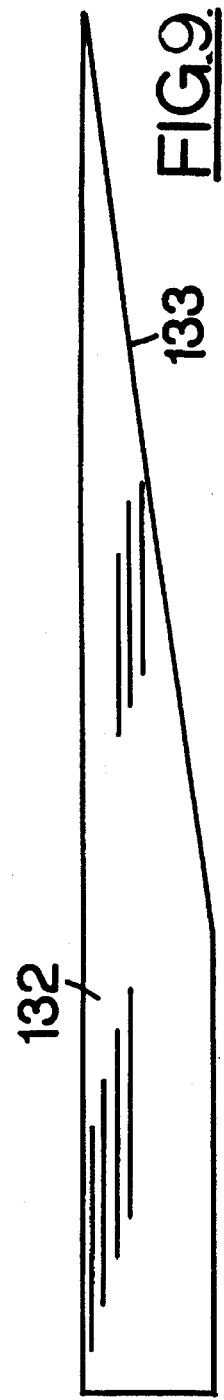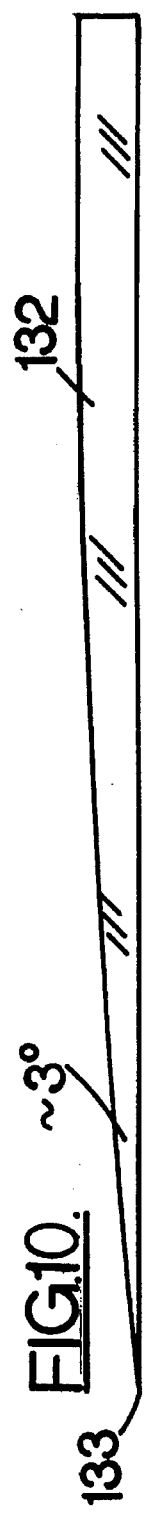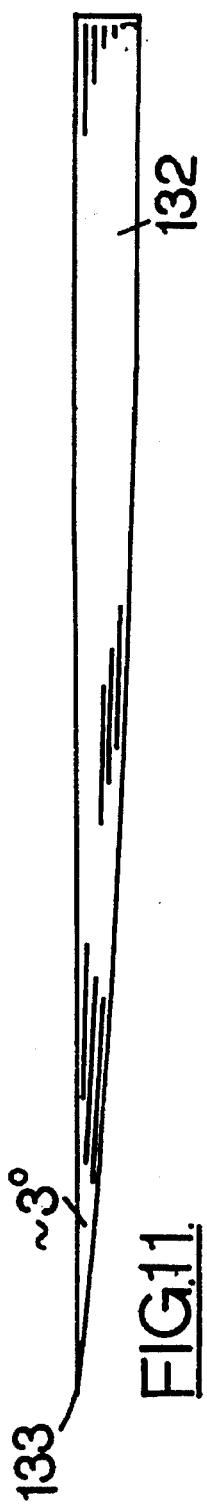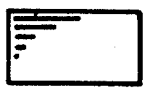
FIG.8.  FIG.9.  FIG.10. ~3°  FIG.11. ~3°  FIG.12.  FIG.13.

 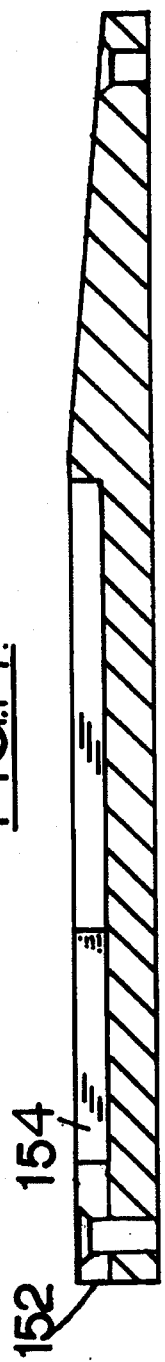 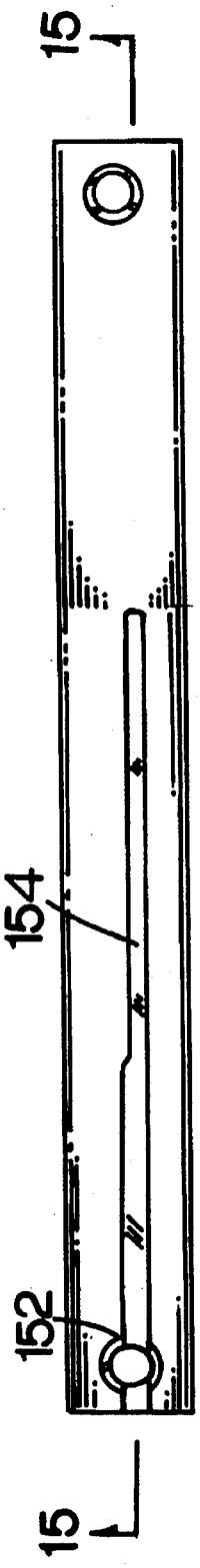   

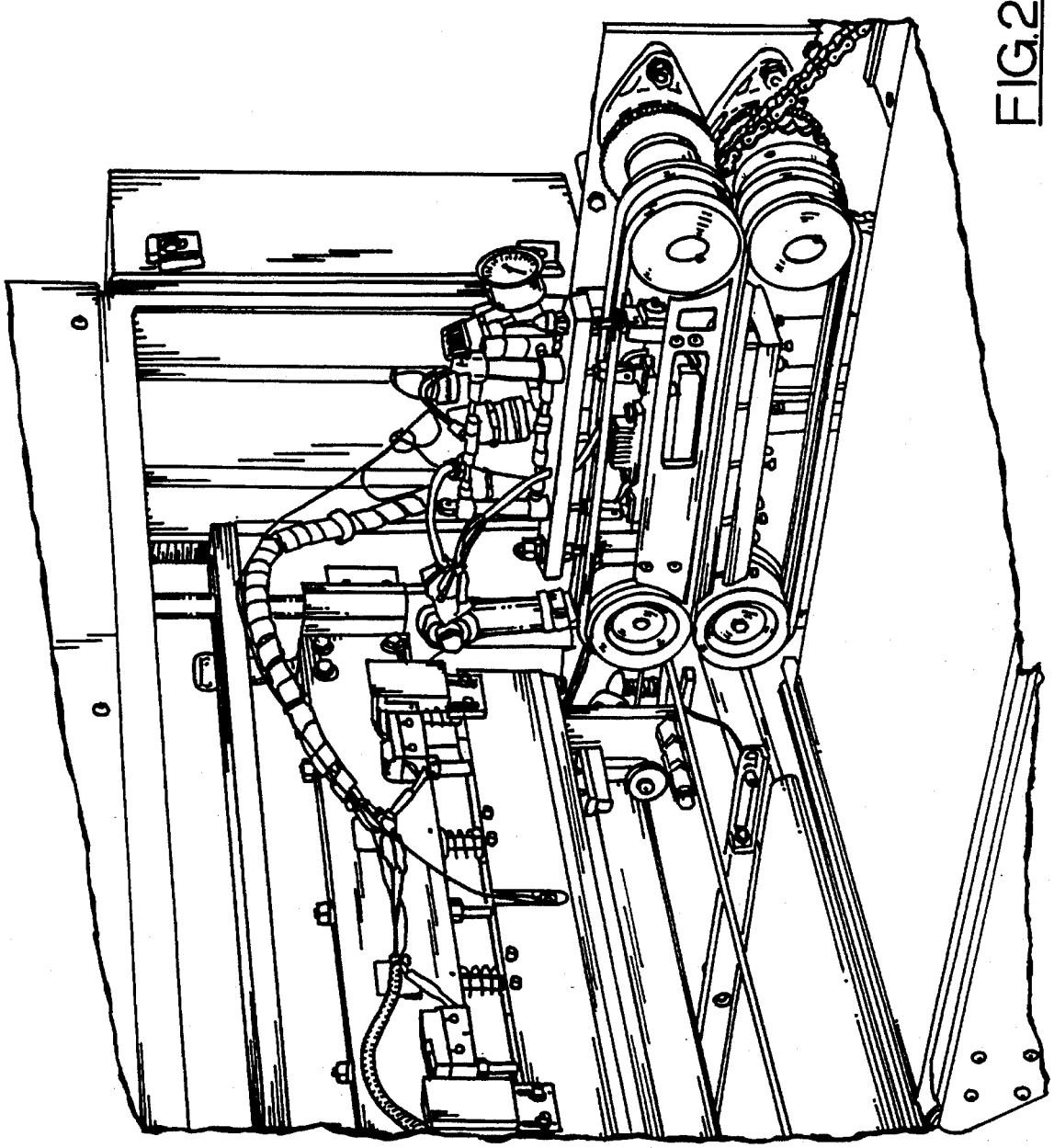

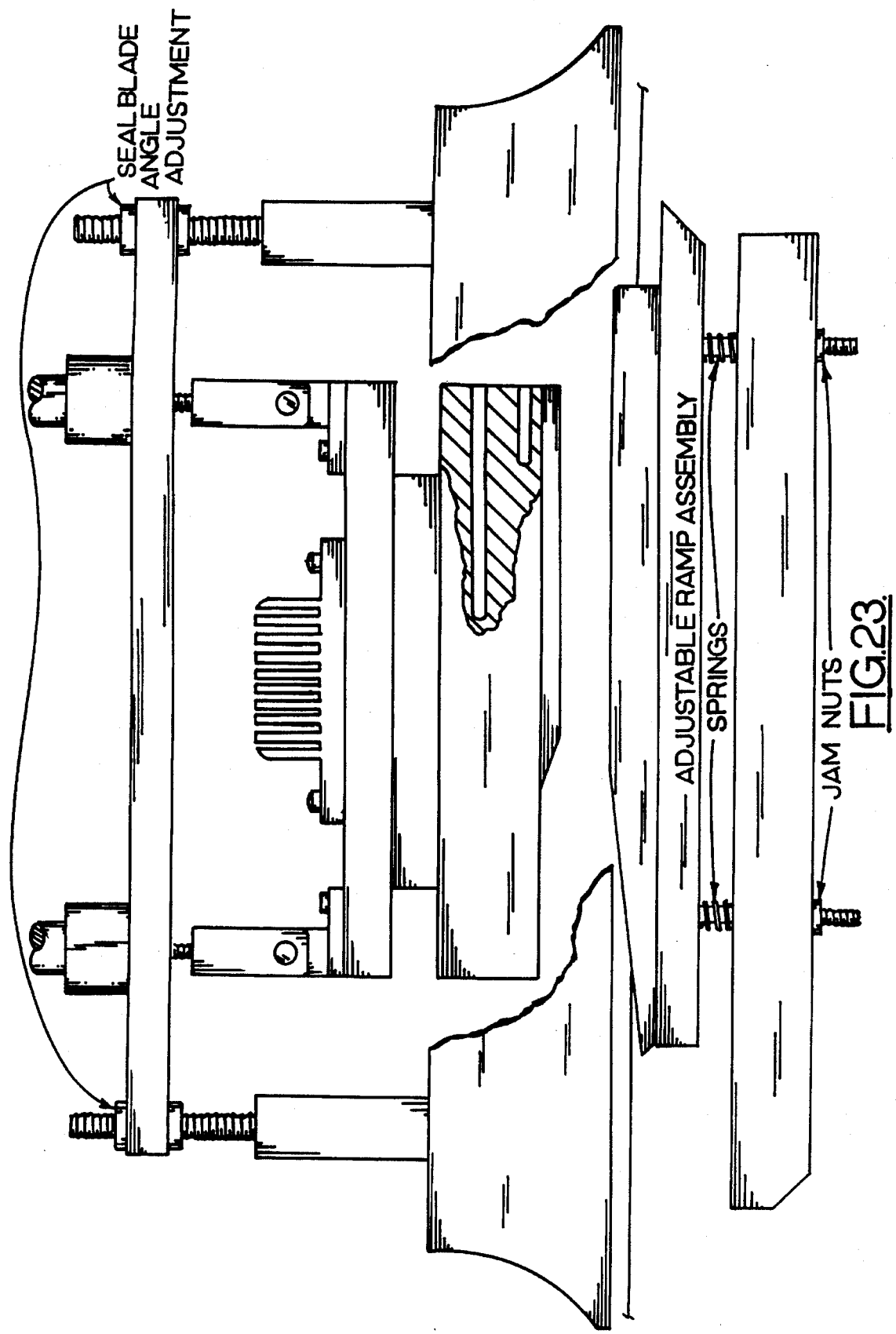

FIG.29. REFER TO TEST DATA SHEETS.

ANGLE*

PITCH*

INFINITE UNIVERSAL SEALING ASSEMBLY

This is a divisional of copending application Ser. No. 08/056,060 filed on Apr. 30, 1993.

BACKGROUND OF THE INVENTION

The present invention relates in general to an assembly for heat sealing a thermoplastic heat-shrinkable plastic film and, more particularly, to a heat sealing assembly for cutting and sealing a seam in a film or layers of film without regard to the length of the seam. The infinite sealing assembly of this invention is an improvement over the conventional "L-type" sealing apparatus used in conjunction with conventional center folded-type shrink film.

With the conventional heat sealing apparatuses, such as the L-sealers used to seal a heat shrinkable plastic film around an object to be packaged, it is generally known to wrap the object to be packaged, lower the L-sealer, and cut and seal together abutting surfaces of the centerfold film.

A sealed side and one end edge of a package is thus formed by the severing and sealing of the heat shrinkable plastic film by the elevated temperature of the L-sealer blade or knife. The opposite edge is formed by the fold in the centerfold film. Excess film is cut by a heated wire or knife. The now loosely packaged object is heated to form the completed shrink wrap package.

Another drawback of the conventional sealing apparatus is a limitation of a fixed longitudinal dimension of an object that can be sealed in the centerfold film. Fixed dimensions are inherent when using an "L" type sealer, particularly the longitudinal dimension. The size of the item can be altered to some degree dependent on the particular sealing apparatus. However, there are usually limitations on the size of the item to be packaged, particularly the length of the package.

Existing sealing equipment also has a drawback related to the costs associated with capital investment and efficiency. If a package that is either longer, shorter, wider, or narrower than operating characteristics of a particular sealing machine, then another sealer is required to complete the package. Sealing equipment is expensive and may require a high volume to justify the cost of additional acquisitions of equipment.

A further drawback of existing sealing equipment is that the operating characteristics limit the film types which can be utilized with the particular sealing equipment. Equipment which satisfactorily cuts and seals a lightweight shrink wrap film may not be suitable for sealing a heavier film.

In addition, existing sealing equipment does not allow the operator to adjust the blade depth and angle to increase or decrease the dwell time of the film on the blade, thereby varying the degree of sealing of the film.

SUMMARY OF THE INVENTION

Accordingly, it is the object of the present invention to provide an infinite sealing assembly that is adapted to allow longitudinal sealing of a film of any practical length. With the infinite sealing assembly of this invention a low cost piece of equipment is disclosed in which it has been found to remove the length limitation when designing merchandise packaging for conventional shrink packaging.

Another object of the present invention is to provide an infinite sealing assembly that which produces an otherwise conventional side seal of infinite length on a packaged item of any practical size.

A further object of the present invention is to provide an infinite sealing assembly which may incorporate automatic separation of waste film. The assembly of this invention preferably provides for discarding the waste film as it is separated during sealing.

Still another object of the present invention is to provide an infinite sealing assembly adaptable for use in operative association with conventional packaging machines, comprising conveyors, rollers, and transverse sealing equipment.

Still a further object of the present invention is to provide an infinite sealing assembly that can be used by unskilled or semi-skilled workers without an unreasonable amount of additional training.

Another object of the present invention is to provide an infinite sealing assembly that requires few moving parts and is operational with all or most conventional shrink wrap films. The basic sealing assembly structure may have operational temperatures in most if not all desired ranges incorporated in an all electric assembly in one preferred embodiment (with thermocouple or equivalent control from approximately 0° to 600° F.). The resulting assembly provides a cutting and sealing means that can be retracted when not in use.

Still a further object of the present invention is to provide an infinite universal sealing assembly operational with wrap films which are substantially heavier than conventional shrink wrap films.

Another object of the present invention is to provide an infinite universal sealing assembly in which the angle at which the film is sealed and cut can be varied to provide optimal sealing for a particular application and film.

Still another object of the present invention is to provide an infinite universal sealing assembly in which the dwell time of the cutting and sealing blade on the film can be increased to result in improved sealing.

Still another object of the present invention is to provide an improved infinite sealing assembly in which a cutting blade has a combined contoured surface and sharp cutting edge for cutting and sealing a variety of films.

Still a further object of the present invention is to provide an improved sealing assembly in which a method for cutting and sealing a variety of films is improved by using a variable pitch and angle film ramp arrangement in combination with a heated cutting blade which can be angled and pitched independent of the film ramp to achieve a desired cutting and sealing of the film.

To accomplish the foregoing and other objects of this invention there is provided an infinite sealing assembly for accomplishing a package seal, for example in a package to be shrink wrapped. The infinite sealing assembly comprises a belt drive that pulls and tracks a conventional center-folded heat shrink film. An item to be wrapped and sealed is placed within the plastic centerfold film in a conventional manner prior to inserting the film into the nip of the belt drive.

A side seal assembly comprises a heated blade maintained in contact with the film as the film is drawn through the assembly by the belt drive and tracking components or their equivalents. The heated blade is shaped to sever and seal the plastic film. As the film is being pulled and tracked through the system the heated blade cuts an excess film portion and melts the two free edges of the center fold plastic film together, thereby creating a side seal. The excess or waste film is transported through the system and discarded by a pair of the endless film drive belts.

In the disclosed embodiment herein, there is provided a separator mandrel which in a preferred embodiment prevents the waste film from contacting and melting to the plastic of the wrapped item. The other pair of belts continues to pull and track the plastic of the wrapped item.

In an alternate embodiment there is provided an improved blade and blade support assembly. The blade is elongated and the angle of the blade is variable to allow increased dwell time of the film on the blade, allowing the assembly to seal and cut heavier films. The pitch of the blade relative to a slotted ramp is also variable to present more or less of a leading cutting edge of the heated blade to the film to be cut and sealed.

The improved blade assembly is preferably used in combination with a slotted ramping assembly located opposite the blade. The blade can be adjusted to extend partially into the slotted portion of the ramp, thereby increasing the dwell time of the film on the blade. This allows the operator to vary the degree of sealing desired for a particular application.

It will be understood that the improvements described and claimed herein are accomplished with an improved heated cutting blade and film ramp combination that is designed and intended to fit within the space required for the pivoted heated blade and film ramp of the other preferred embodiment described and claimed in the parent application. Thus, the film adjustment and film transport mechanism already described in the parent application operates with the present infinite universal sealing system as well without modification.

These and other objects and features of the present invention will be better understood and appreciated from the following detailed description of one embodiment thereof, selected for purposes of illustration and shown in the accompanying drawings.

BRIEF DESCRIPTION OF THE DRAWINGS

FIG. 6 is a side elevation of an alternate embodiment sealing apparatus illustrating an improved blade assembly and film support ramp;

FIG. 8 is a side elevation of the improved blade of FIG. 6;

FIG. 9 is a side elevation of the machined side of FIG. 8;

FIG. 10 is a plan view of the blade of FIG. 6;

FIG. 11 is a bottom view of the blade of FIG. 6;

FIG. 12 is a front view of the blade of FIG. 6;

FIG. 13 is a rear view of the blade of FIG. 6;

FIG. 14 is a side elevation of the improved ramp of FIG. 6;

FIG. 15 is a cross-sectional view of the ramp of FIG. 6;

FIG. 16 is a plan view of the ramp of FIG. 6;

FIG. 17 is a front view of the ramp of FIG. 6;

FIG. 18 is a rear view of the ramp of FIG. 6;

FIG. 19 is a plan view of the improved ramp in combination with the improved blade of FIG. 6;

FIG. 21 is a perspective view of one embodiment of the present invention viewed from a side of the invention nearest the film and article to be wrapped and sealed;

FIG. 23 is an illustration of an assembly incorporating the present invention; and FIGS. 24 through 30 are illustrations of an anvil and a blade according to the teaching of the present invention.

DETAILED DESCRIPTION

Figure 1:
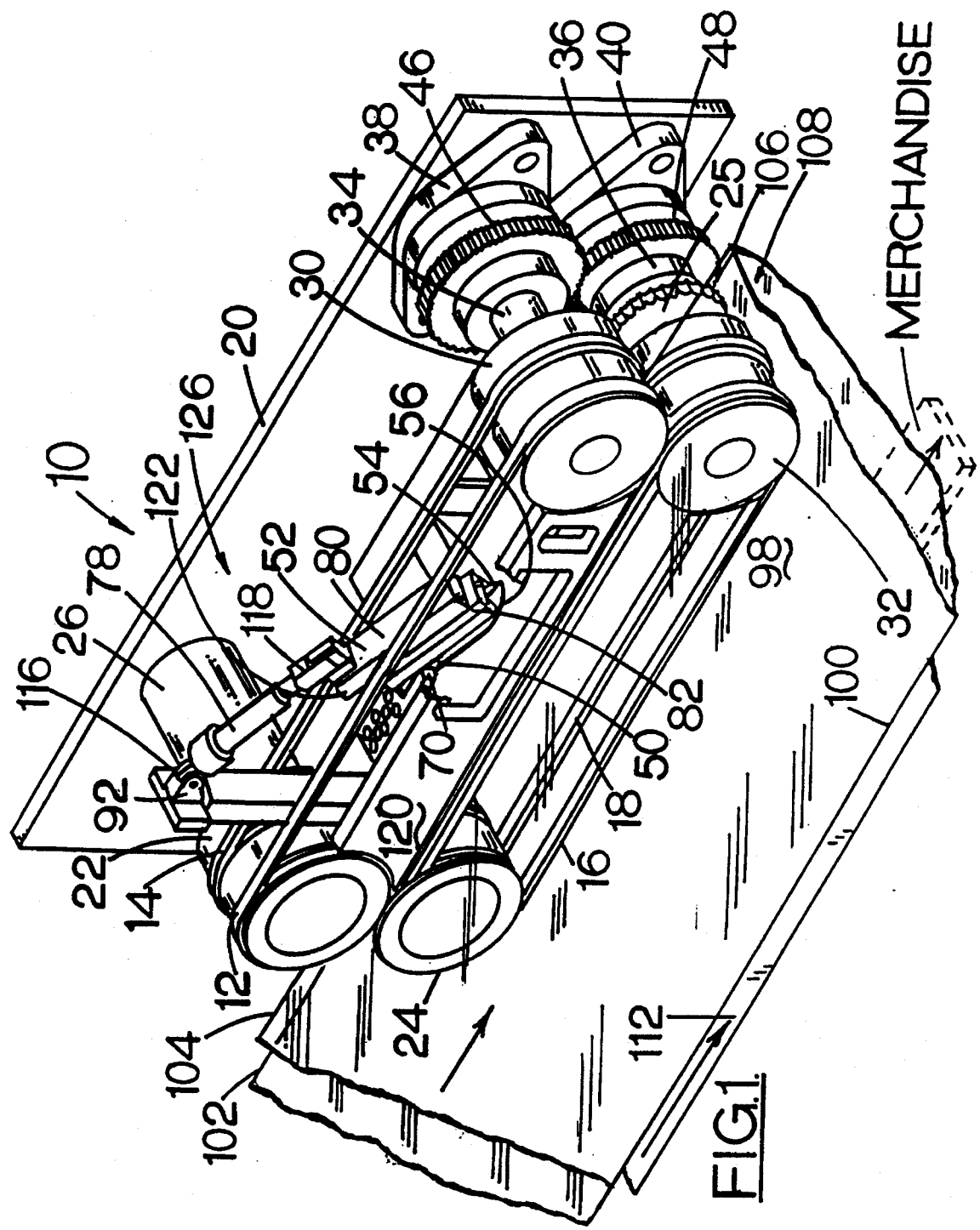
FIG. 1 is a perspective view of an infinite sealing assembly constructed in accordance with the present invention.
Figure 2:
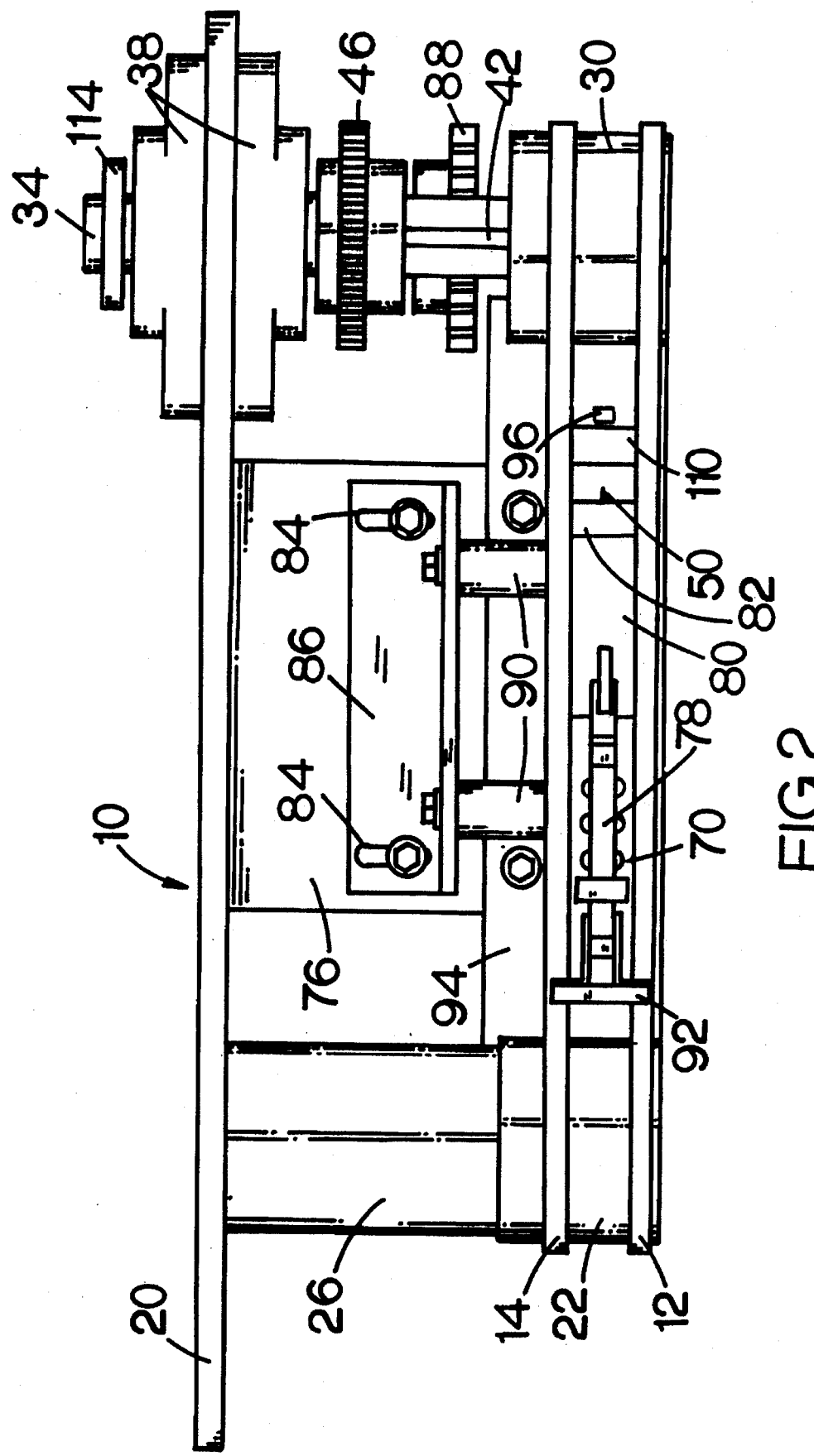
FIG. 2 top plan view of the infinite sealing assembly depicted in FIG. 1.

Referring now to the drawings there is shown a preferred embodiment for the infinite sealing assembly system of this invention. The infinite sealing assembly is described in connection with a packaging application to form a package with a conventional centerfold plastic film and is characterized by an improved generally unlimited length of the side seal required for the package.

The drawings show the infinite sealing assembly 10 that comprises four endless drive belts, 12, 14, 16 and 18. The drive belts comprise an upper outer drive belt 12, upper inner drive belt 14, lower outer drive belt 16 and a lower inner drive belt 18. The drive belts are arranged such that the outermost surface of the upper belts 12 and 14 are in driving contact with the outermost surface of lower belts 16 and 18. This drive belt arrangement and its operation is the same for both of the sealing systems described herein.

The driving contact between the associated drive belts will track the film as it is conveyed through the assembly since the film is conveyed along at least two parallel paths. The drive belts provide a preferred embodiment of a conveying means for conveying a length or portion of a conventional centerfold shrink film 98 (shown as an overlay to the drawing figures) through the infinite sealing assembly 10. It will be understood that the width of the film and the location of the fold portion 100 varies with respect to the item or merchandise being packaged.

It is known in conventional L-sealing equipment to vary the location of the fold line 100 to vary the tightness of the package after shrink wrapping. The tracking means provided by either embodiment of this invention allows the system to wrap any length product and place the fold where desired on the side of the package opposite the infinite sealing assembly.

As the package and film are conveyed through the assembly of this invention the tracking feature maintains a relatively steady positioning of the fold 100 and the one free edge 102 and another free edge 104 of the centerfold film 98.

As depicted and suitable for either preferred embodiment, the belts 12, 14, 16, 18 are attached to an attachment bulkhead 20 by means of an upper and lower idler roller 22, 24 and idler roller shafts 26, 28 and an upper and lower drive belt roller 30, 32 and upper and lower drive shafts 34, 36. The idler roller shafts 26, 28 are attached to the bulkhead 20 the idler rollers 22 and 24 freely rotate around the idler roller shafts 26 and 28. A retainer prevents the idler rollers 22 and 24 from leaving the idler roller shafts 26 and 28.

The upper and lower drive shafts 34 and 36 are attached to the attachment bulkhead 20 by an upper and lower flange bearing 38 and 40, respectively. The flange bearings 38 and 40 hold the drive shafts 34 and 36 in a desired position on the attachment bulkhead 20. The flange bearings allow the drive shafts 34 and 36 to rotate with respect to the bulkhead 20.

In either preferred embodiment, a key way 42 on drive shafts 34, 36 and drive rollers 30, 32 receives a complementary key 44 to both ensure rotation of the upper and lower drive rollers 30, 32 with their respective drive shafts 34, 36 and to further secure the rollers 30, 32 to the drive shafts 34, 36, respectively.

The upper endless drive belts 12 and 14 are mounted in a parallel spaced relationship on the upper idler roller 22 and upper drive roller 30. The lower endless drive belts 16 and 18 are mounted in a parallel spaced relationship on the lower idler roller 24 and lower drive roller 32. As previously mentioned, it is this parallel spacing that provides the desired tracking of the film as the film is conveyed through either assembly of the present invention.

Upper and lower drive spur gears 46, 48, respectively, are mounted on the upper and lower drive shafts 34, 36. The spur gears 46, 48 also engage key 44 for desired rotation with the drive shafts 34, 36. As illustrated in the drawings, the upper drive spur gear 46 engages the lower drive spur gear 48 to provide synchronized rotation of the upper and lower drive rollers 30 and 32, respectively. Drive shaft collar locks 114 retain the drive shafts relative to the attachment bulkhead 20 and in their desired positions.

The upper endless drive belts 12 and 14 are in driving contact with the lower endless drive belts 16 and 18. This arrangement provides for nipping or pinching opposing free edges of a centerfold plastic film to be joined and trimmed, if necessary, and pulling and tracking the film through either embodiment of the infinite sealing assembly 10 or 130.

The infinite sealing assembly 10 further comprises a heated blade 50 providing means for cutting the film and sealing the two free edges 102, 104 of the folded film to form a desired side seal 106 and an otherwise conventional package or merchandise receiving tube 108. The heated blade 50 comprises an elongated bar having a generally square end 52 for mounting and a relatively contoured working end 54. It will be seen from the drawing figures that the working end 54 is depicted as having a point.

It will be understood that with the use of the heated blade the working end may be more or less pointed on various end-pivoting embodiments of the present invention without departing from the teaching of the invention. The preferred end-pivoting embodiment does include the "point" depicted in the accompanying drawings.

A portion 56 of the blade 50 is defined by the meeting of a generally curved portion of the blade located generally between the two side edges of the elongated bar as depicted generally in the drawing figures. The radius of the curve can vary depending on the particular application and use of the infinite sealing assembly. It will be understood by one skilled in the art that the shape, contour, and curves of the blade 50 may vary so long as it fulfills its use as the cutting and sealing means.

Figure 3:
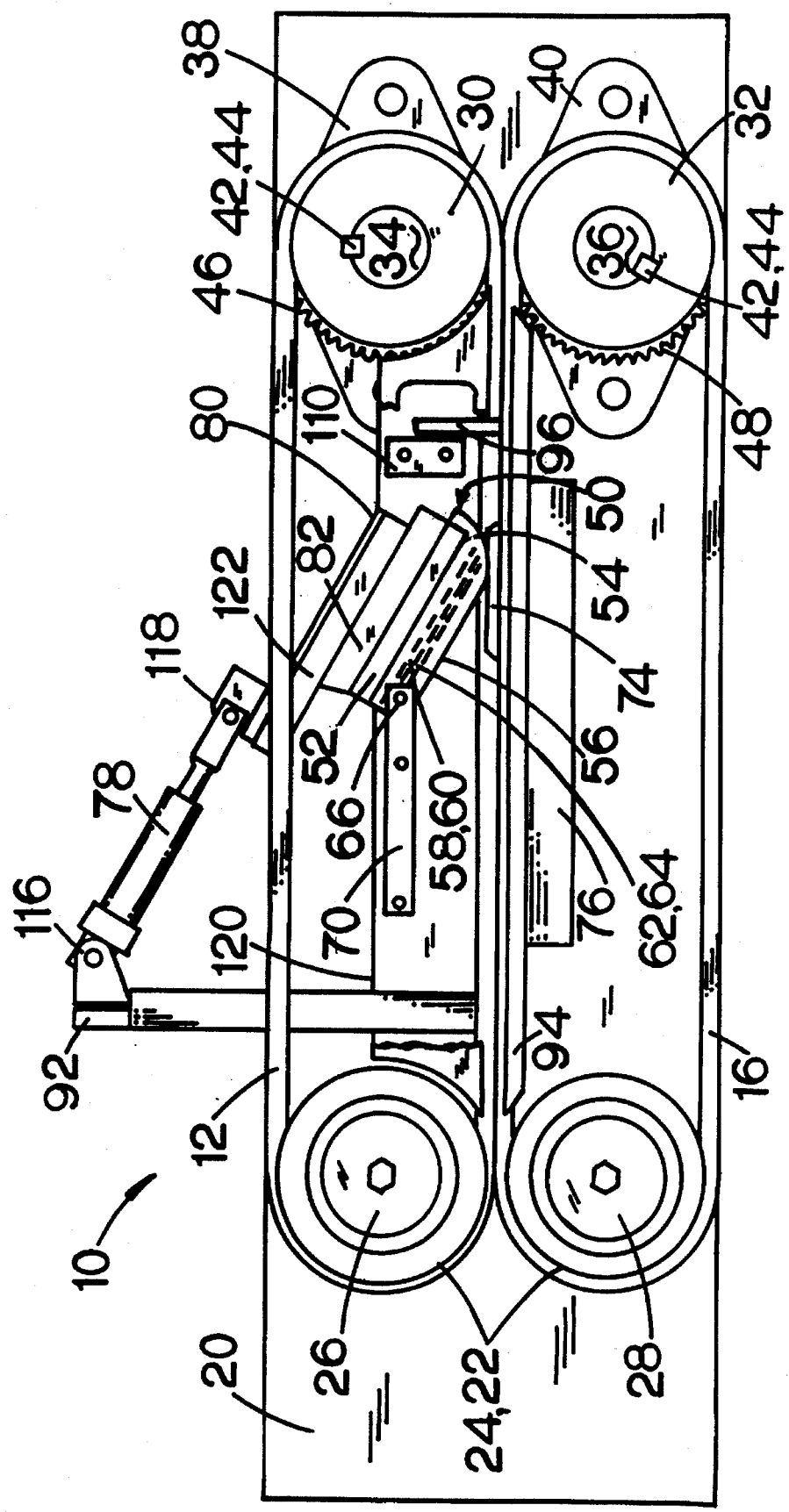
FIG. 3 is a side view of the infinite sealing assembly depicted in FIG. 1 in which a heated cutting blade pivots on an air-operated piston and is shown in an extended position for cutting, trimming and sealing a length of film.
Figure 4:
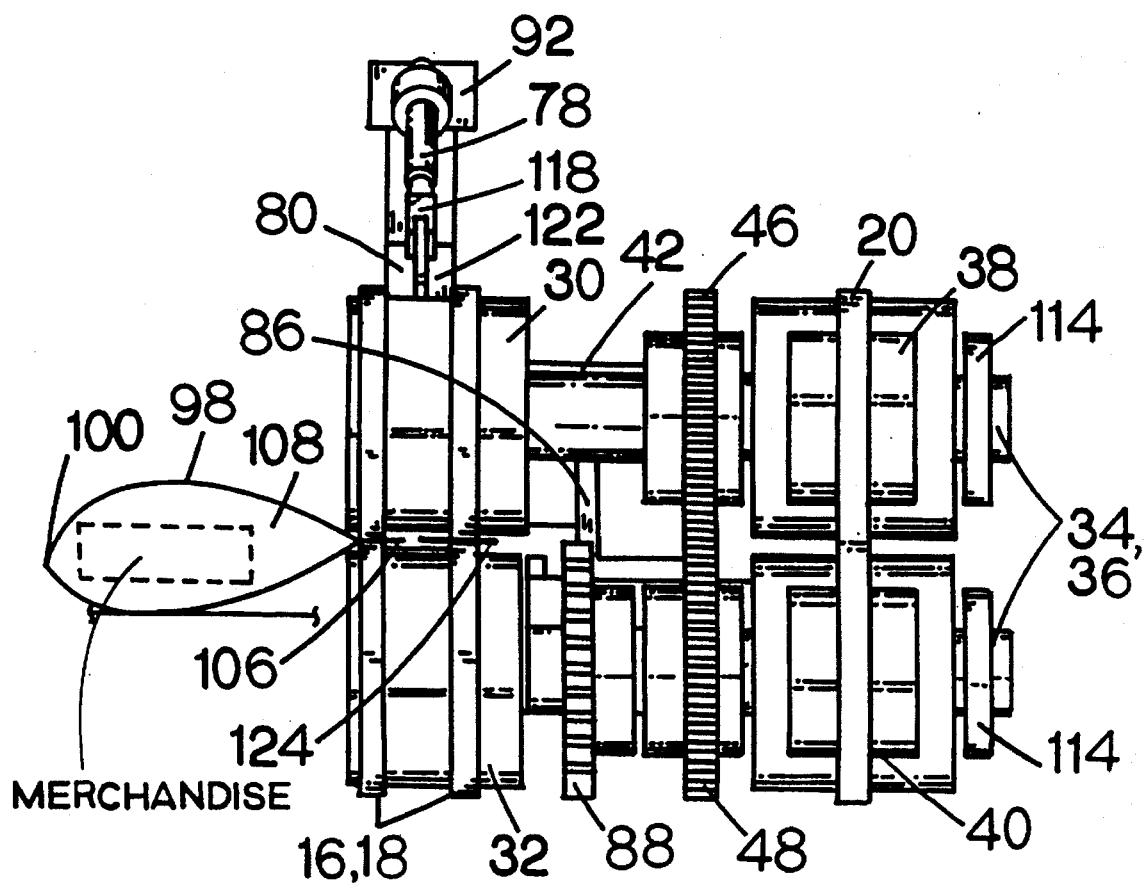
FIG. 4 is a front view of the infinite sealing assembly depicted in FIG. 1.
Figure 5:
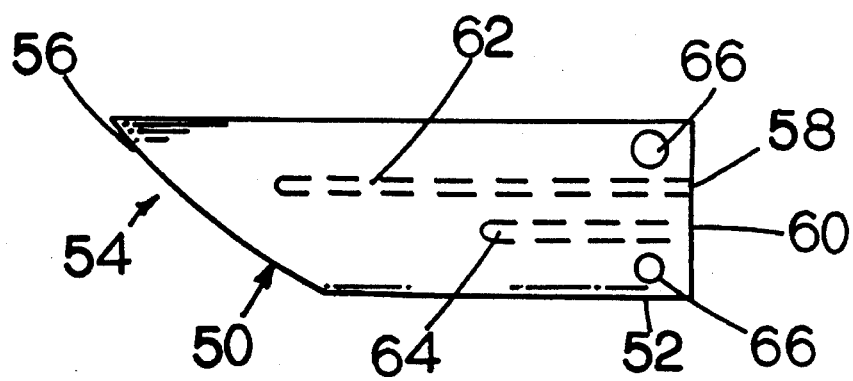
FIG. 5 is a side elevation view of a cutting, trimming, and sealing blade constructed in accordance with the present invention.

A preferred embodiment of the heated blade contains two generally identical longitudinal bores 58, 60 (shown superimposed in FIG. 3) extending to a depth proximate the contoured working end 54. The bore 58 is sized to house and contain a heating means such as an element 62. The heating element 62 is typically a conventional "firerod" or ceramic rod or equivalent having an electrically heated element.

The second bore 60 for receiving a temperature control means, generally about half the depth of the first bore 58, is sized to house and contain a conventional "J" wire or thermocouple 64 (or the equivalent). The heating means 62 and the heating control means 64 are shown superimposed in FIG. 3 and it will be understood that the bores in the blade member 50 will be sized to accommodate the heating means and heating control means selected for use with a particular embodiment of this invention.

The thermocouple 64 controls and monitors the temperature of heated blade 50. In a preferred embodiment a control panel (not shown) might include a readout of the blade temperature for the convenience of the operator. In a preferred embodiment the thermocouple or its equivalent controls the heating element 62 and thus the temperature of the blade member 50.

The operating temperature of the heated blade 50 will vary depending on the particular operating parameters including but not limited to, film material, and operating speed. The temperature is thermostatically controlled in the preferred embodiment, and a typical operating temperature is approximately 550° Fahrenheit with from approximately 55 to 70 gauge (inclusive) polypropylene film while running through the infinite seal assembly at an average speed of approximately 90 feet/minute.

Operating at a maximum speed of approximately 110 feet/minute with from approximately 55 to 70 gauge (inclusive) polypropylene it is expected that the operating temperature would typically be approximately from 580° to 590° Fahrenheit (inclusive). These operating parameters may vary and it will be recognized that actual operating parameters will depend on a particular application and associated operating conditions.

The heated blade 50 in the depicted embodiment further contains a transverse bore 66 generally for mounting the blade 50 in operative association with the infinite sealing assembly 10. The bore 66 pivotally attaches the heated blade 50 to a conventional adjustable aluminum mount member 70. The mounting member 70 of the illustrated embodiment attaches, for example bolts to an inner phenolic member, located generally behind (in the view of FIG. 3) and connected to an outer aluminum member 120.

An assembly 126 provides an attachment for a lifting means for the heating and severing means and is illustrated as providing a pivot attachment 118 between a lifting mechanism 78 and a heat resistant attachment means 122. The lifting mechanism is used to raise and lower the heated blade 50. The heated blade 50 when in the lower position operatively contacts a teflon seal plate 74 the function of which is to act as an anvil. Thus, as the plastic film is pulled and tracked through the infinite sealing assembly 10, the plastic film is pulled over and above the seal plate 74 as the heated blade 50 cut and seals the film.

The combination of an upper blade pivot member 116, a lower blade pivot member 118 (preferably a clevis member associated with the air operated cylinder 78) and the pivot connection between the blade 50 and the clevis 70 provides the desired arcuate movement of a preferred embodiment of the present invention as the air cylinder extends (cutting, trimming, and sealing position) and retracts (raised blade position).

A seal unit support block 76 attaches to the attachment bulkhead 20 in any suitable conventional manner to hold, secure and support the film support ramp 74, lifting mechanism 126 and associated protective guard plates, and guides.

The lifting mechanism 126 in the preferred embodiment 10, comprises an air operated cylinder 78 (air lines not shown) pivotally connected to a cylinder support bar 92. The opposite end of the air operated cylinder 78 attaches to the heated blade 50 by way of a tongue attached phenolic member comprising a heat sink plate 80 and heat barrier 82. The heat barrier 82 connects to the heated blade 50.

The combination of heat resistant attachment means 122, preferably a phenolic material, heat barrier 82, and the heat sink plate 80 insulates the lifting mechanism from the extreme temperatures of the heated blade. It has been observed that failing to adequately insulate the heated blade from the surrounding structure results in heat-related deformations in the surrounding structure.

The deformation could alter the actual movement of the heated blade to cause it to contact ramp 74 too much or not enough, thereby resulting in improper sealing of the film. The other insulating structures are intended to isolate the heat of the blade 50 from the structure. The embodiments disclosed and described above for cutting and sealing arrangement 10 set forth the best approach known at the time the parent application was filed.

It will be understood that those skilled in the art may arrive at better assemblies as a result of increasing familiarity with the construction and operation of the present invention.

Attached to the seal unit support block 76 is an adjustable angle bracket 86. Adjustment is provided as depicted by elongated slots 84 in the angle bracket and bolts through the slots 84 to support block 76. Attached to the adjustable angle bracket 86 by means of additional attachment blocks 90 is an inner phenolic guard 82 attached to clevis 70.

A lower belt guide plate 94 attached to support block 76 provides a guide to maintain the lower outer endless belt 16 in proper position and assist in maintaining the desired tracking of the film as it is conveyed through the assembly 10.

The cylinder support bar 92 extends down and between the upper portions of the upper outer and upper inner endless belts 12 and 14 and terminates in an attachment to the inner phenolic guide 82. Adjustment for the position of heated blade 50 is thereby provided by adjustments to the adjustable angle bracket 86. The heated blade 50 extends downward from the cylinder support bar 92 between the upper inner endless drive belt 12 and the upper outer endless drive belt 14 and contacting the seal plate 74 which is also positioned between the belts 12 and 14.

In a preferred embodiment for assembly 10 as well as alternate embodiment 130 illustrated in the drawings, a master drive chain sprocket 88 with a front side 25 operatively attaches to the lower drive shaft 36. The chain sprocket 88 is secured and keyed to the drive shaft by key 44 to provide synchronized rotation between the sprocket 88 and shaft 36. An external power source, such as an electric motor (not shown), provides a source of rotational motion for the chain and master drive chain sprocket 88.

The alternate embodiment referred to above is shown in FIGS. 6–20. An improved blade 132 and blade support assembly generally designated 130, as well as an improved film support ramp 152 are used to result in improved sealing of various types of films, including heavier gauge films. Test results of a prototype of the alternate embodiment are found in the following examples:

EXAMPLE 1

Film Set-Up Chart

Date: Dec. 15, 1993 through Dec. 21, 1993
Film Manufacturer: Dupont Corp.
Type: Clysar
Series: LLP-F
Gauge: 60
Side Seal Set-Up "Universal System"
Seal Ramp
   Height: Front 2⅝", Rear 2⅞"
   Angle: 5°
   Pitch: 7°
   Radius: ⅜
Seal Blade
   Temp: 445° F.
   Depth: Front 1 29/32" Rear 2"
   Angle: 3°
Speeds "Film Travel":75 feet per min.
Comments: Film Sealed Very Well-Formed a 1/16 Bead-Strong-No Build-up.
Technician: Dave Gassel

EXAMPLE 2

Film Set-Up Chart

Film Manufacturer: DuPont Corp.
Type: Clysar
Series: LLP-F
Gauge: 75
Side Seal Set-Up "Universal System"
Seal Ramp
   Height: Front 2⅝", Rear 2⅞"
   Angle: 5°
   Pitch: 7°
   Radius: ⅜
Seal Blade
   Temp.: 455° F.
   Depth: Front 1 29/32" Rear 2"
   Angle: 3°
Speeds "Film Travel": 75 Feet per min.
Comments: Film Sealed Very Well-Formed a 1/16" Bead-Strong-No Build-up.
Technician: Dave Gassel

EXAMPLE 3

Film Set-Up Chart

Date: Dec. 15, 1993 through Dec. 21, 1993
Film Manufacturer: DuPont Corp.
Type: Clysar
Series: HP-F
Gauge: 60
Side Seal Set-Up "Universal System"
Seal Ramp
   Height: F 2⅝", Rear 2⅞"
   Angle: 5°
   Pitch: 7°
   Radius: ⅜
Seal Blade
   Temp.: 462° F.
   Depth: Front 1 29/32" Rear 2"
   Angle: 3°
Speeds "Film Travel": 75 Feet per min.

Comments: Film sealed well-Formed a seal little less than 1/16"-Little build-up.
Technician: Dave Gassel

EXAMPLE 4

Film Set-Up Chart

Date: Dec. 15, 1993 through Dec. 21, 1993
Film Manufacturer: DuPont Corp.
Type: Clysar
Series: EHC-F
Gauge: 75
Side Seal Set-Up "Universal System"
Seal Ramp
  Height: Front 2 3/8", Rear 2 5/8"
  Angle: 5°
  Pitch: 6°
  Radius: 3/8
Seal Blade
  Temp.: 475° F.
  Depth: Front 1 27/32"-R 1 29/32"
  Angle: 4°
Speeds "Film Travel": 75 Feet per min.
Comments: Seals Were Acceptable-Formed "thin" and "beady" seal-No Build-Up.
Technician: Dave Gassel

EXAMPLE 5

Film Set-Up Chart

Date: Dec. 15, 1993through Dec. 21, 1993
Film Manufacturer: DuPont Corp.
Type: Clysar
Series: XLP-F
Gauge: 60
Side Seal Set-Up "Universal System"
Seal Ramp
  Height: F 2 3/8", R 2 3/4"
  Angle: 5°
  Pitch: 5°
Seal Blade
  Temp.: 455° F.
  Depth: F 1 27/32 R 2
  Angle: 4°
Speeds "Film Travel": 75 Feet per min.
Comments: Film seal well-Formed a good bead-No build-up.
Technician: Dave Gassel

EXAMPLE 6

Film Set-Up Chart

Date: Dec. 15, 1993 through Dec. 21, 1993
Film Manufacturer: DuPont Corp.
Type: Clysar
Series: HP-F
Gauge: 75
Side Seal Set-Up "Universal System"
Seal Ramp
  Height: Front 2 5/8", Rear 2 7/8"
  Angle: 5°
  Pitch: 7°
  Radius: 3/8
Seal Blade
  Temp.: 469° F.
  Depth: Front 1 29/32" Rear 2"
  Angle: 3°
Speeds "Film Travel": 75 Feet per min.
Comments: Sealed Well-Formed a bead of less than 1/16"-Little build-up.
Technician: Dave Gassel

EXAMPLE 7

Film Set-Up Chart

Date: Dec. 15, 1993 through Dec. 21, 1993
Film Manufacturer: DuPont Corp.
Type: Clysar
Series: EZ-F
Gauge: 75
Side Seal Set-Up "Universal System"
Seal Ramp
  Height: Front 2 7/8"-Rear 2 31/32"
  Angle: 5°
  Pitch: 8°
  Radius: 3/8
Seal Blade
  Temp.: 455° F.
  Depth: Front 1 15/16"-Rear 2 1/16"
  Angle: 4°
Speeds "Film Travel": 75 Feet per min.
Comments: Film ran acceptable-Formed a thin bead-No build-up.
Technician: Dave Gassel

EXAMPLE 8

Film Set-Up Chart

Date: Dec. 21, 1993 through Dec. 30, 1993
Film Manufacturer: W. R. Grace Co.
Type: Cryovac
Series: D-955
Gauge: 60
Side Seal Set-Up "Universal System"
Seal Ramp
  Height: Front 2 13/16"-Rear 2 15/16"
  Angle: 5°
  Pitch: 6½°
  Radius: 3/8
Seal Blade
  Temp.: 470° F.
  Depth: Front 1 29/32"-Rear 2 1/16"
  Angle: 3°
Speeds "Film Travel": 75 Feet per min.
Comments: Film sealed very well-Formed strong bead-Little build-up.
Technician: Dave Gassel

EXAMPLE 9

Film Set-Up Chart

Date: Dec. 21, 1993 through Dec. 30, 1993
Film Manufacturer: W. R. Grace Co.
Type: Cryovac
Series: D-955
Gauge: 75
Side Seal Set-Up "Universal System"
Seal Ramp Height: Front 2 13/16"-Rear 2 15/16"
Angle: 5°
Pitch: 6½°
Radius: 3/8
Seal Blade
  Temp.: 475° F.
  Depth: Front 1 29/32"-Rear 2 1/16"
  Angle: 3°
Speeds "Film Travel": 75 Feet per min.
Comments: Film sealed well-Formed a 1/16" bead-Strong-No build-up.
Technician: Dave Gassel

EXAMPLE 10

Film Set-Up Chart

Date: Jan. 3, 1994 through Jan. 5, 1994
Film Manufacturer: W. R. Grace Co.
Type: Cryovac
Series: D-955
Gauge: 100
Side Seal Set-Up "Universal System"
Seal Ramp
  Height: Front 2 13/16"-Rear 2 15/16"
  Angle: 5°
  Pitch: 6½°
  Radius: 3/8
Seal Blade
  Temp.: 475° F.
  Depth: Front 1 29/32"-Rear 2 1/16"
  Angle: 3°
Speeds "Film Travel": 75 Feet per min.
Comments: Film sealed very well-Formed a good bead-Little build-up.
Technician: Dave Gassel

EXAMPLE 11

Film Set-Up Chart

Date: Jan. 10, 1994 through Jan. 15, 1994
Film Manufacturer: Okura
Type: Vanguard
Series: 501
Gauge: 50
Side Seal Set-Up "Universal System"
Seal Ramp
  Height: Front 2 5/8"-Rear 2 7/8"
  Angle: 5°
  Pitch: 7°
  Radius: 3/8
Seal Blade
  Temp.: 425° F.
  Depth: Front 1 27/32"-Rear 1 29/32"
  Angle: 3°
  Speeds "Film Travel": 75 Feet per min.
  Comments: Film seals very well-Forms a very strong seal.
No build-up.
  Technician: Dave Gassel

EXAMPLE 12

Film Set-Up Chart

Date: Jan. 10, 1994 through Jan. 15, 1994
Film Manufacturer: Okura
Type: Vanguard
Series: 501
Gauge: 70
Side Seal Set-Up "Universal System"
Seal Ramp
  Height: Front 2 5/8" Rear 2 7/8"
  Angle: 5°
  Pitch: 7°
  Radius: 3/8
Seal Blade
  Temp.: 430° F.
  Depth: 1 27/32"- Rear 1 29/32"
  Angle: 3°
Speeds "Film Travel": 75 Feet per min.
Comments: Film seals very well-Forms a very strong seal-No build-up.
Technician: Dave Gassel

EXAMPLE 13

Film Set-Up Chart

Date: Jan. 16, 1994
Film Manufacturer: R. J. Reynolds
Type: Krystiltite
Series: T144
Gauge: 60 and 75
Side Seal Set-Up "Universal System"
Seal Ramp
  Height: Front 2 11/16" Rear 2 15/16"
  Angle: 5°
  Pitch: 7½°
  Radius: 3/8
Seal Blade
  Temp.: 525° F.
  Depth: 1 29/32" F 2 1/32" R
  Angle: 3.2°
Speeds "Film Travel": 75 Feet per min.
Comments: Film seals well=Forms good bead=Will require a ceramic coating Builds up carbon.
Technician: Dave Gassel

EXAMPLE 14

Film Set-Up Chart

Date: Dec. 1, 1993 through Dec. 4, 1993
Film Manufacturer: Attain Corp.
Type: Black Poly
Series: 100
Gauge: 1.5 mill.
Side Seal Set-Up "Universal System"
Seal Ramp
  Height: Front 2 13/16" Rear 2 15/16"
  Angle: 5°
  Pitch: 5°
  Radius: 3/8
Seal Blade
  Temp.: 370° F.
  Depth: 1 29/32" F 2" R.
  Angle: 3.2°
Speeds "Film Travel": 60 Feet per min.
Comments: Film seals well Forms good bead. Had to reset down time of knife blade to 3 second watch dog. Recommend ceramic coating.
Technician: Dave Gassel The heated blade 132, shown in FIGS. 8–13, is of an elongated shape with an angled leading edge 133. The blade 132 is elongated to provide an increased heating surface and additional dwell time for film/blade contact for improved sealing. In a preferred embodiment the blade is machined at an angle of approximately 3°. The contoured/machined side of the blade is adjacent the product and the edge of the film to be sealed.

The blade 132 is supported by the blade support assembly 130, shown in FIG. 6. The blade 132 is attached to blade mounting bar 134, which includes heating elements for heating the blade and controlling blade temperature generally as described above for embodiment 10.

A heat resistant means 136 is located between the blade mounting bar 134 and the heat resistant attachment means 138.

Air cylinders 140, 141 (air lines not shown) are attached to the ends of attachment means 138 and to the assembly support bar 144. The connection between attachment means 138 and cylinders 140, 141 includes pivoting members 142. The air cylinders 140, 141 provide for the reciprocating movement of the blade 132. Additional adjustment means, described below, allow the height and/or the pitch of the blade 132 to be varied.

Outwardly of the air cylinders 140, 141, on the ends of the assembly support bar 144 are two variable position vertical supports generally designated 146 with vertical support nuts 147. These vertical supports 146 are mounted on the assembly support bar 144 by a conventional screw and nut assembly.

Tightening or loosening the nuts provides for variation of the angle or pitch of the assembly support bar 144, thereby varying the angle or pitch of the blade 132. While the pitch of the assembly 130 is varied, the pivoting members 142 maintain the blade 132 in alignment with the ramp 152 and a groove or slot in the ramp, described in full below. In a preferred embodiment the support members are 5/16" studs located in 3/8" holes in the top bar 144. The additional space in the holes allows for horizontal adjustment of the heated blade 132.

The vertical supports 146 include mounting portions 148 which are attached by any conventional means, for example bolted, to a phenolic member 82 connected to an outer aluminum member 120 of the sealing machine.

The film support ramp 152, shown in FIGS. 14–18 is mounted on a ramp adjustment assembly generally designated 150. The ramp assembly support 156 is preferably an aluminum block, and is spring mounted by any conventional means 160 to the sealing apparatus to allow adjustment of the vertical ramp angle to correspond to or complement the angle of the cutting and sealing blade 132.

In a preferred embodiment of the adjustable film support ramp 152, the ramp 152 is elongated, and has a sloped leading edge 155 to guide the film into position beneath the blade 132. The ramp 152 further includes a slotted or indented portion 154 located directly opposite and below the blade 132. The leading edge of the ramp 152 has a radius surface that is a 3/8 radius in a preferred embodiment.

When the preferred slotted ramp 152 is utilized, the air cylinders 140, 141 allow the blade 132 to be lowered towards the slot 154, as shown in FIG. 19 and into contact with the film that is carried up over the ramp and the slot 154. Raising the film out of the pulley centerline will progressively stretch the film in contact with the top of the ramp 152 and the heated blade 132. The progressive stretching of the film effectively removes wrinkles which may be present in either layer of the film prior to cutting and sealing by the blade 132. By adjusting the ramp 152 height so that the film is properly stretched, inadequate sealing or "weak" sealing caused by wrinkles in the film can be prevented. The slot is machined into the ramp in a preferred embodiment. The machined slot is wider at the downstream end of the ramp.

The combination of the longer ramp and blade and the angle of the blade relative to the moving film and the contour of the blade surface adjacent the sealing edge of the film results in an improved dwell time of the film on the blade 132. Thus, as the film is cut and sealed it tends to shrink away from the heated blade. The angle and contour of the blade maintains the heated blade in proximity to or contact with the film as it shrinks as it continues to shrink, thereby resulting in an improved film seal.

The film is initially cut by the leading edge 133 of the blade 132, but the film edge remains in contact with or proximity to the heated blade 132 along the length of the blade 132, relative to its' machined angle. This provides for improved sealing, especially of heavier gauge films.

Figure 20:
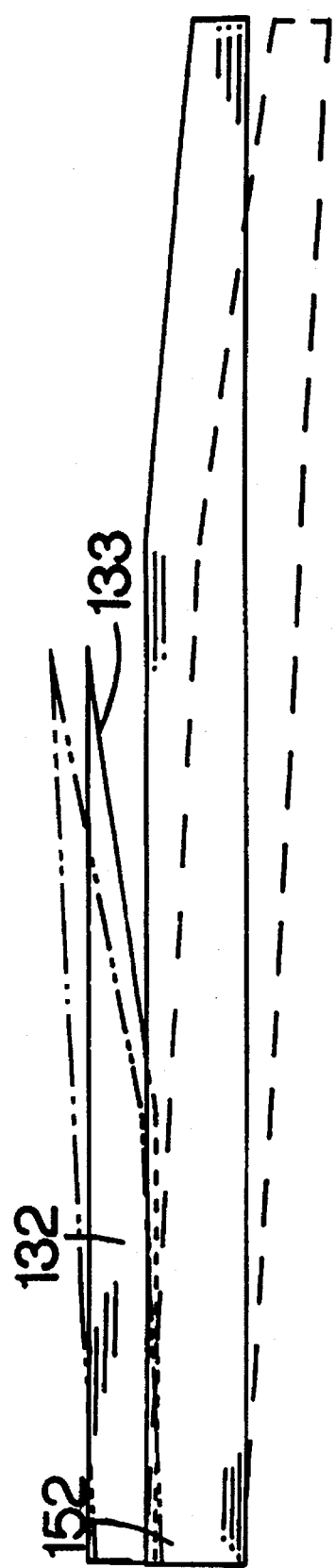
FIG. 20 is a side elevation of the improved blade and ramp of FIG. 6 with alternate angles shown in dashed lines.

The adjustability of the blade and the ramp assembly, shown in FIG. 20, allows the sealing apparatus to be easily adapted for sealing a particular film. The elongated heated blade, in combination with the adjustable angle and slotted ramp, results in an increased dwell time of the film on the blade, allowing the assembly to seal film of heavier gauge than conventional shrink wrap film as well as various types of conventional shrink wrap film.

In operation, in connection with a centerfold shrink wrap film previously mentioned to wrap a package or merchandise, an item to be wrapped is placed between the layers of a centerfold heat shrink plastic film in a conventional manner (not shown). The item and plastic film is placed on rollers or conveyor, again in a conventional manner.

As is normally the case, the two loose layers of plastic film are joined together and introduced to the operative nip of the endless drive belts 12, 14, 16 and 18. The endless drive belts pull and track the free edges of the plastic film through the infinite sealing assembly 10 or the improved assembly 130.

As the plastic film is conveyed through the assembly 10, cutting and sealing means, in the depicted embodiment the heated blade 50 cuts the plastic film and the heat melts and joins the cut or separated edges to seal the free edges of the film forming a bead seal.

A film separator means comprises a mandrel 96, attached in a preferred embodiment to an outer aluminum guard front attachment block 110 and adjustable on the block 110. The mandrel 96 separates the waste plastic film portion 124 from the sealed plastic film 98 forming a shrink wrap bag or package receiving tube 108 around the item or merchandise. In elevation the mandrel is preferably approximately 1/8" wide at the bottom. The mandrel of the preferred embodiment tapers down from a relatively wider top portion attached to the block 110.

The waste is carried away by the upper inner and lower inner endless drive belts 14 and 18, while the plastic wrapped item is being transported by the upper outer and lower outer endless drive belts 12 and 16 which operate in register with the conventional package conveyor 112. These steps are followed in assembly 130 with modifications necessitated by the improved design that will be understood by one skilled in the art.

It will be understood that the infinite sealing assembly operates in register with the conveyor in order to insure identical speed of the film on the conveyor and the film through the assembly 10 or the assembly 130. This can be accomplished in in either embodiment by any suitable conventional fashion, such as with a chain drive, motor controls or other speed control systems for constant speed arrangements.

The film separator mandrel 96 prevents the heated edges of the waste from rejoining the heated edges of the side seal and remelting an unwanted connection between the plastic wrap and the waste. The waste can be collected in a proper receptacle at an appropriate end of the infinite sealing assembly.

It will be recognized by one skilled in the art that the angled blade of assembly 130 limits the need for a mandrel similar to 96 although further separation of the waste from the sealed film may be desirable in some applications, but that will have to be determined for each application.

It will now be understood that an item of any length can be effectively wrapped by this system. Once wrapped the item is subjected to a heat furnace which causes the heat shrink film to shrink and tightly wrap the merchandise in a plastic film.

In a preferred embodiment heated blade 50 needs to move only approximately 1/8" or approximately 3°. The material used is primarily aluminum for the metal and a suitable teflon or teflon coating for the heated members or the members that come into contact with the heated blade or film. It will be recognized that only a small amount of air pressure is required to operate the arm carrying the heated blade.

In a preferred embodiment the heated blade 50 may be ceramic coated for the purpose of resisting any tendency of the film to stick to the blade.

Figure 7:
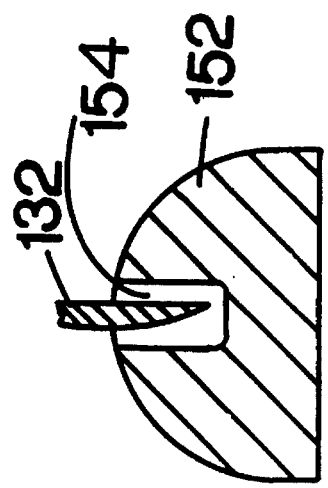
FIG. 7 is a cross-sectional view of the blade and film ramp illustrated in FIG. 6.

The operation of the alternate embodiment of FIGS. 6–8 is similar to the operation described above for the first embodiment, with the added steps of adjusting the blade and ramp means angles. This adjustment determines the dwell time necessary for proper sealing of the particular film to be utilized in the sealing apparatus.

As the film is carried through the assembly 130 as previously described for embodiment 10 the dual action air cylinders are operated to extend or retract the blade assembly 130. It will be understood that solenoids (not shown) or other equivalent means are available to accomplish the extension and retraction of the blade assembly 130 although the use of air operated cylinders is presently preferred.

Figure 22:
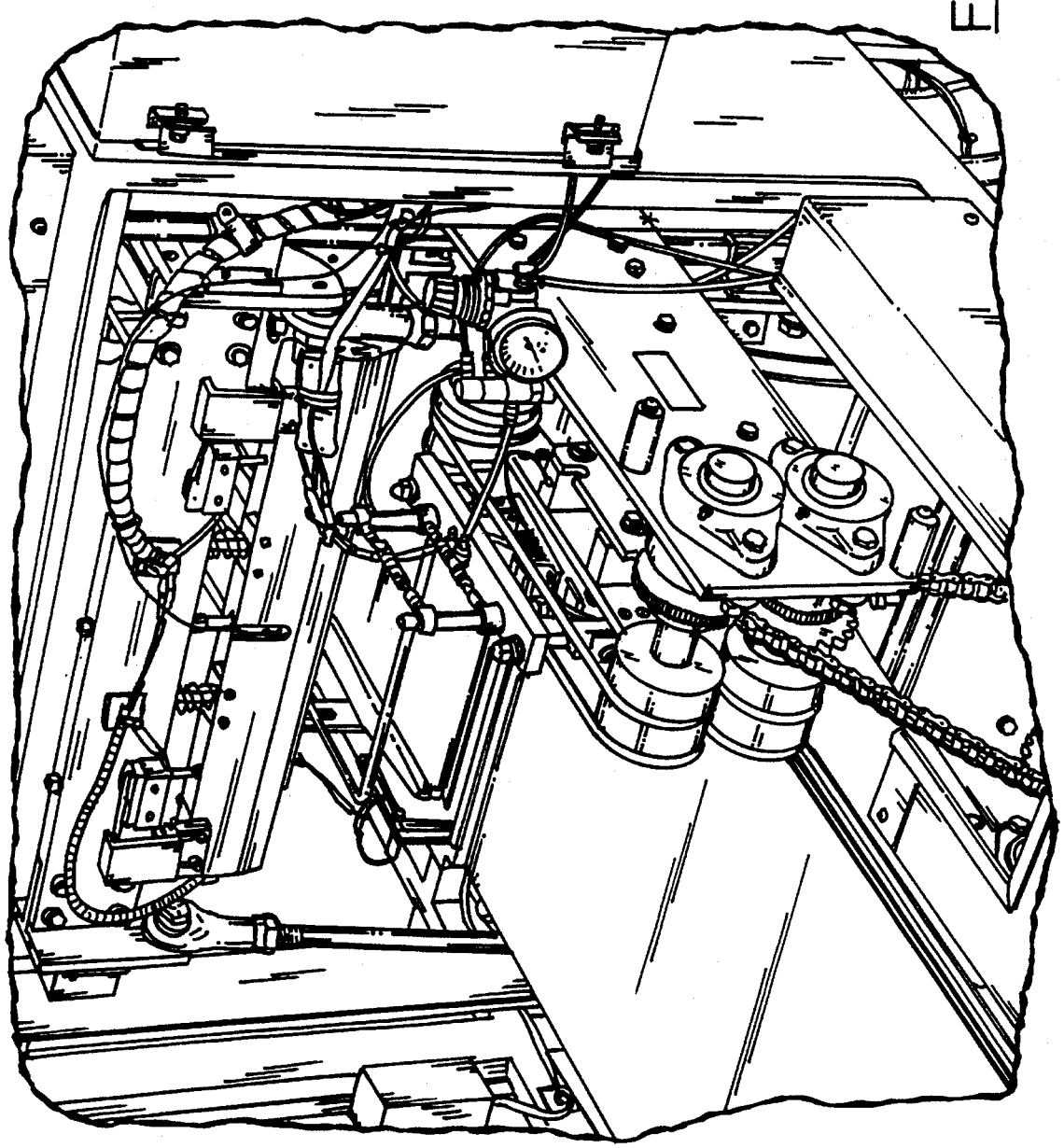
FIG. 22 is a perspective view of the embodiment of the invention illustrated in FIG. 21 from a side of the invention opposite the film and article to be wrapped and sealed.
Figure 25:
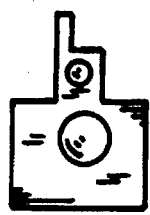
Figure 27:
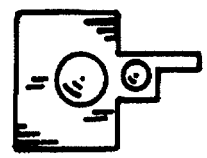
Figure 24:
Figure 26:
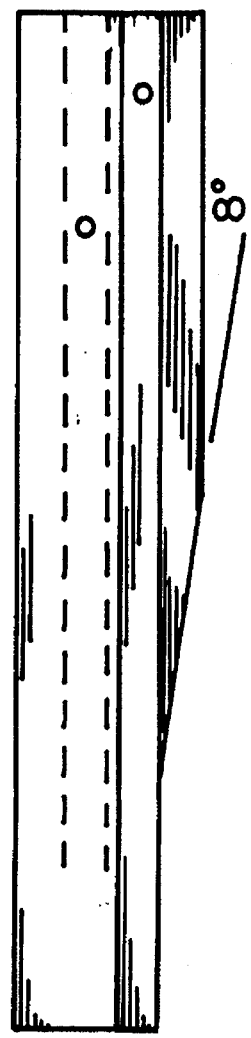
Figure 28:
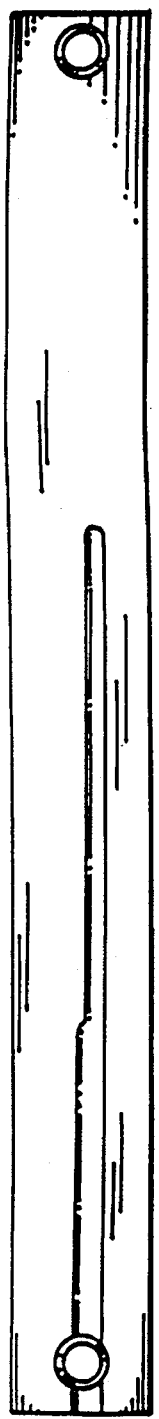
Figure 30:
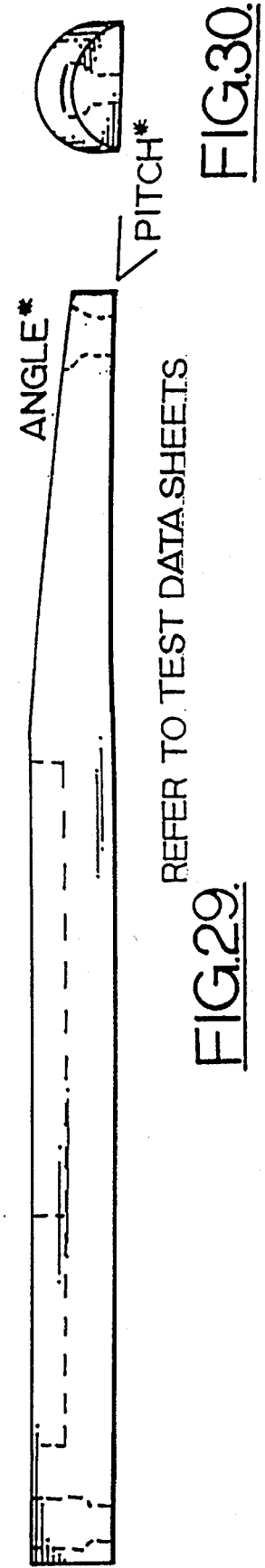

Two figures, FIGS. 21 and 22 illustrate one preferred embodiment of the assembly 130 and the accompanying air supply, air cylinders, and electrical connections which will be recognized by one skilled in the art. FIGS. 23 through 30 are included to illustrate one version of the present improved sealing assembly.

Commercially available films of gauges 50 through 100 have been successfully cut and sealed with the alternate embodiment disclosed above. These films include DuPont Corp. Clysar®, 60 and 75 gauge; W. R. Grace Co. Cryovac®, 60, 75, and 100 gauge; Okura Vangard®, 50 and 70 gauge; and R. J. Reynolds KRYSTILTITE®, 60 and 75 gauge.

From the foregoing description those skilled in the art will appreciate that all of the objects of the present invention are realized. An infinite sealing assembly has been shown that is adapted to allow longitudinal sealing of a film of any practical length. A relatively low cost piece of equipment is disclosed which removes any practical length limitation or consideration when designing merchandise packaging for conventional shrink packaging.

The present invention provides an infinite sealing assembly which incorporates automatic separation and discarding of waste film. The infinite sealing assembly of this invention is adapted for use in operative association with conventional packaging machines, comprising conveyors, rollers, and transverse sealing equipment.

Few moving parts are illustrated and the infinite sealing assembly is operational with all or most conventional shrink wrap films. Operational temperature range of this invention is broadly available over most if not all desired ranges. The resulting assembly provides a cutting and sealing means that can be retracted when not in use.

The alternate embodiment of the infinite sealing assembly of the present invention provides an elongated variable angle blade and an adjustable angled slotted film support ramp. The assembly provides a blade which can be positioned to extend partially into the ramp slot to increase the time the film edges are in contact with the heated blade. This allows cutting and sealing of gauges of films heavier than conventional shrink wrap films, by increasing the dwell time of the film on the heated blade.

While a specific embodiment has been shown and described many variations are possible. The particular shape, configuration, drive means or drive design may be changed or altered to suit a particular application or operating parameter. The shape or configuration of the cutting and sealing means, the sealing assembly conveying means and associated members and their dimensions may changed as desired to suit the equipment with which it is used.

The film used need not be centerfold stock and it will be within the scope of this invention to place two sealing assemblies of the present invention on opposing sides of a package conveyer to seal and trim opposing pairs of free edge shrink wrap film or its equivalent. The cutting and sealing means may be separated into a plurality of heated elements by one with skill in the art once the disclosure of the present invention is understood.

It will be further understood that a conventional transverse sealing apparatus and the infinite sealing assembly of the present invention may be combined with a conventional conveying member.

In another embodiment the entire infinite sealing assembly can be mounted on a sealing apparatus so as to allow vertical adjustment of the infinite sealing assembly. This may be advantageous since it is known that conventional shrink wrap packaging should have the side seal at approximately the center line of the object to be wrapped.

Thus, as objects of different height are conveyed through the assembly and are wrapped, the infinite sealing assembly can be adjusted to the right height for each. The adjustment could be provided by a slotted mounting, threaded adjustments, servo-motors, or an equivalent mechanism.

Having described the invention in detail, those skilled in the art will appreciate these modifications may be made of the invention without departing from its spirit. Therefore, it is not intended that the scope of the invention be limited to the specific embodiments illustrated and described. Rather, it is intended that the scope of this invention be determined by the appended claims and their equivalents.

What is claimed is:

1. An infinite sealing assembly for cutting and sealing a film, comprising:

means for conveying a film through a sealing assembly, the film having at least two free edges abutting one another;

means for tracking the film in a generally desired path through the sealing assembly and maintaining the free edges in an abutting relationship;

means for trimming an excess portion of the film as the film is conveyed through the assembly the trimming means comprising a generally internally heated blade and an associated source of heat to raise the temperature of the blade as required to trim the film;

a heat source receiving means defined by the heated blade and the heat source located generally within the heat source receiving means;

reciprocating means associated with the heated blade, the reciprocating means allowing movement of the heated blade into contact with the film and out of contact with the film;

means for actuating the blade in response to the reciprocating means, the actuating means actuating the blade for maintaining operative contact between the blade and the film during operation of the sealing assembly, and further allowing the angle of the blade relative to the film to be adjusted, the actuating means and the conveying means operating relatively independent of one another;

ramp means for effecting elevation of the film during operation of the sealing assembly, the ramp means located substantially below the blade and in a generally supporting relationship relative to the film so as to provide support for the film while the film is in operative contact with the blade; and the trimming means heated blade and the associated source of heat to raise the temperature of the blade as required to seal together the free edges of the film further providing means for sealing the free edges of the film as the film is conveyed through the assembly.

2. An infinite sealing assembly as set forth in claim 1 wherein the conveying means comprises at least a pair of opposing moving belt members.

3. An infinite sealing assembly as set forth in claim 1 wherein the tracking means comprises a plurality of generally parallel conveying means.

4. An infinite sealing assembly as set forth in claim 1 wherein trimming means comprises a heated means operatively associated with the sealing assembly and the conveying means and the tracking means.

5. An infinite sealing assembly as set forth in claim 4 wherein the heat source is a heated cartridge rod located within the heating means.

6. An infinite sealing assembly as set forth in claim 1 wherein the assembly further comprises a means for removing waste film trimmed off by the trimming means.

7. An infinite sealing assembly as set forth in claim 1 wherein the actuating means is a pneumatic actuator.

8. An infinite sealing assembly as set forth in claim 1 wherein the ramp means is adjustable to correspond to the angle of the blade, and further includes a slotted portion located directly opposite the blade.

9. An infinite sealing assembly for cutting and sealing a centerfold shrink wrap film, comprising:

a plurality of moving belt conveying apparatuses for conveying a film through a sealing assembly, the film having at least two free edges abutting one another and an opposing centerfold;

tracking means for the film for conveying the film in a generally desired path through the sealing assembly and maintaining the free edges in an abutting relationship;

means for trimming an excess portion of the film as the film is conveyed through the assembly the trimming means comprising a generally internally heated blade and an associated source of heat to raise the temperature of the blade as required to trim the film;

a heat source receiving means defined by the heated blade, the heat source located generally within the heat source receiving means;

reciprocating means associated with the heated blade, the reciprocating means allowing movement of the heated blade into contact with the film and out of contact with the film;

means for actuating the blade in response to the reciprocating means, the actuating means actuating the blade for maintaining operative contact between the blade and the film during operation of the sealing assembly, and further allowing the angle of the blade relative to the film to be adjusted, the actuating means and the conveying means operating relatively independent of one another;

a ramp member located adjacent and substantially below the heated blade, the ramp member effectively elevating and stretching the portion of the film to be trimmed and sealed into a generally supporting relationship relative to the film so as to provide support for the film while the film is in operative contact with the heated blade, the ramp means including a slotted portion located opposite the blade and the angle of the ramp being adjustable to correspond to the angle of the blade; and the trimming means heated blade and the associated source of heat to raise the temperature of the blade as required to seal together the free edges of the film further providing means for sealing the free edges of the film as the film is conveyed through the assembly.

10. An infinite sealing assembly as set forth in claim 9 wherein the moving belt conveying apparatus comprises at least a pair of adjoining and opposing moving belt members for tracking the film as it moves through the assembly.

11. An infinite sealing assembly as set forth in claim 9 wherein trimming means comprises a heated means operatively associated with the sealing assembly and the moving belt conveying apparatus.

12. An infinite sealing assembly as set forth in claim 11 wherein the heat source is a cartridge rod located with the heating means.

13. An infinite sealing assembly as set forth in claim 9 wherein the assembly further comprises a means for removing waste film trimmed off by the trimming means.

14. An infinite sealing assembly as set forth in claim 9 wherein a separator means for separating excess film is provided in order to maintain an adequate distance between the trimmed and sealed portions of the film in order to keep the separated portions from becoming sealed together, thereby reducing equipment jams normally resulting from entanglement between trimmed and sealed film.

15. An infinite sealing assembly as set forth in claim 14 wherein the separator means is a mandrel located in the film path and intermediate the trimmed excess film and the sealed edge of the film.

16. An infinite sealing assembly as set forth in claim 9 wherein the plurality of moving belt conveying apparatus comprises an upper outer drive belt, an upper inner drive belt, a lower outer drive belt, and a lower outer drive belt, the plurality of the drive belts defining the conveying and tracking surfaces for conveying the film through the sealing assembly.

17. An infinite sealing assembly as set forth in claim 9 further comprising means for adjusting the sealing assembly relative to the height of a package to be sealed.

* * * * *